Jan. 3, 1956  J. H. FRIES, JR  2,729,735
ELECTRIC RANGE

Filed Sept. 18, 1952  2 Sheets-Sheet 1

Inventor:
John H. Fries Jr,
by *His Attorney.*

United States Patent Office 2,729,735
Patented Jan. 3, 1956

2,729,735

ELECTRIC RANGE

John H. Fries, Jr., Louisville, Ky., assignor to General Electric Company, a corporation of New York Application September 18, 1952, Serial No. 310,278

4 Claims. (Cl. 219—20)

This invention relates to electric ranges and, more particularly, to electric ranges having an oven in which foods may be baked or broiled.

The cooking of foods in the oven of an electric range by either broiling or baking is often attended by the generation of smoke which passes out into the kitchen through the oven vent and also, during broiling, through the front opening of the oven. In most cases, the smoke produced during these cooking operations is a mixture of vaporized greases and water vapor, the greases being present whenever animal or vegetable fat is present in the material being cooked and the temperature of the material is raised above the smoking point of such fats. The smoke thus generated and carried outside the oven is, of course, undesirable both because it forms stains on surfaces with which it comes in contact and because its odor is frequently objectionable.

Accordingly, a principal object of this invention is to provide an improved electric range constructed and arranged to substantially eliminate the discharge of smoke from the oven during both broiling and baking operations.

Another object of this invention is to provide an electric range in which smoke generated in the oven during broiling or baking operations is converted into substantially colorless and odorless gases before being discharged from the oven vent.

A further object of this invention is to provide an electric range having means for burning the smoke generated in the oven during broiling or baking operations so as to prevent the discharge of such smoke from the oven.

Further objects and advantages of my invention will become apparent as the following description proceeds and the features of novelty which characterize my invention will be pointed out with particularity in the claims annexed to and forming a part of this specification.

Briefly stated, in accordance with one aspect of my invention, I provide an oven structure in which the heating elements of the broiling unit are utilized to burn the smoke generated during broiling while the smoke generated during baking is burned by an auxiliary heating unit mounted in the oven vent. The heating elements of the broiling unit are supported adjacent the lower surface of a perforated reflector pan mounted in spaced relation to the top wall of the oven and the oven vent opening is positioned in the same top wall. Because the perforations in the reflector pan are spaced in close proximity to portions of the heating element and because a depending baffle at the front of the oven is provided to prevent leakage of smoke through the front opening, the smoke is heated sufficiently to cause its combustion before it passes out of the oven enclosure. Since the broiling unit is only intermittently energized, if at all, during baking, the auxiliary heating unit in the oven vent is continuously connected to a source of power during baking to insure combustion of smoke produced during this cooking operation.

For a better understanding of my invention, reference may be made to the accompanying drawing in which Figure 1 is a side elevation view illustrating an electric range embodying this invention, parts of the range being broken away so as to illustrate certain structural details.

Figure 1:
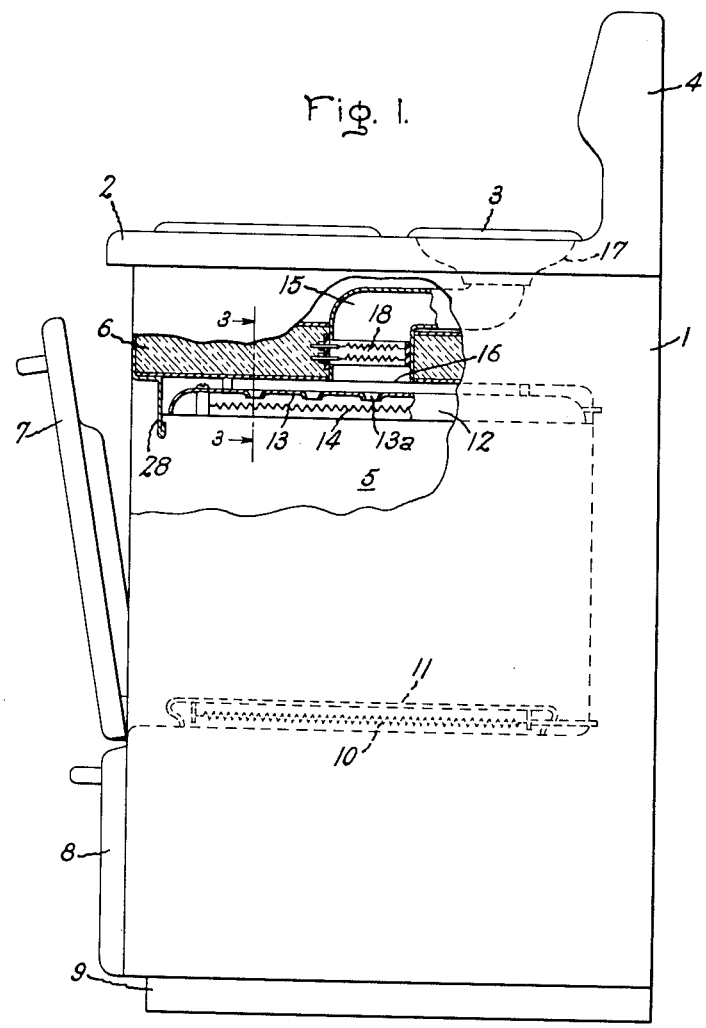

Referring to the drawings, Figure 1 illustrates one form of my invention embodied in an electric range comprising a cabinet 1, a cooking top 2, a plurality of surface heating units including heating unit 3, a backsplash structure 4, and an oven 5. Oven 5 comprises insulated walls including top wall 6 defining a heating compartment having a front opening in which an oven door 7 is mounted. The lower portion of the cabinet 1 may include storage space having a front opening closed by door 8 and a base structure 9 upon which the cabinet 1 is supported. Mounted on the bottom wall of oven 5 is a baking unit 10 adapted to supply heat for baking purposes. Preferably, baking unit 10 is provided with a shield 11 to prevent direct radiation of heat upon the material being cooked. To provide radiant heat for broiling purposes, a broiling unit 12 comprises a reflector pan 13 and a heating element 14 is mounted adjacent top wall 6 in spaced relation thereto. It will be understood that food supports or racks (not shown) for supporting materials to be cooked may be located in oven 5 between baking unit 10 and broiling unit 12.

The oven vent structure forming a part of this invention comprises an oven vent tube 15 extending from a vent opening 16 in top wall 6 of the oven to an opening in the exterior surface of the range. As illustrated in Figure 1, the latter opening may be the opening in the cooking top 2 in which surface heating unit 3 is mounted. Thus, the upper end of vent tube 15 may extend directly under the funnel-shaped reflector pan 17, it being understood that surface heating unit 3 comprises a curved or spiral-shaped sheathed heating element and therefore permits the free passage of gases while, at the same time, effectively hiding the vent opening. The utilization of a surface heating unit as the outlet of an oven venting system is more fully disclosed in United States Patent 2,525,062, issued to Leo F. Berg on October 10, 1950. However, this particular location of the outlet of my oven venting system is not an essential feature of the present invention and, if desired, a separate outlet in the cooking top 2, the backsplash structure 4, or the side walls of cabinet 1 may be provided. It will be understood that vent tube 15 may be rectangular in cross section and be fabricated from box-like tube sections or it may include curved wall portions, or both.

Figure 5:
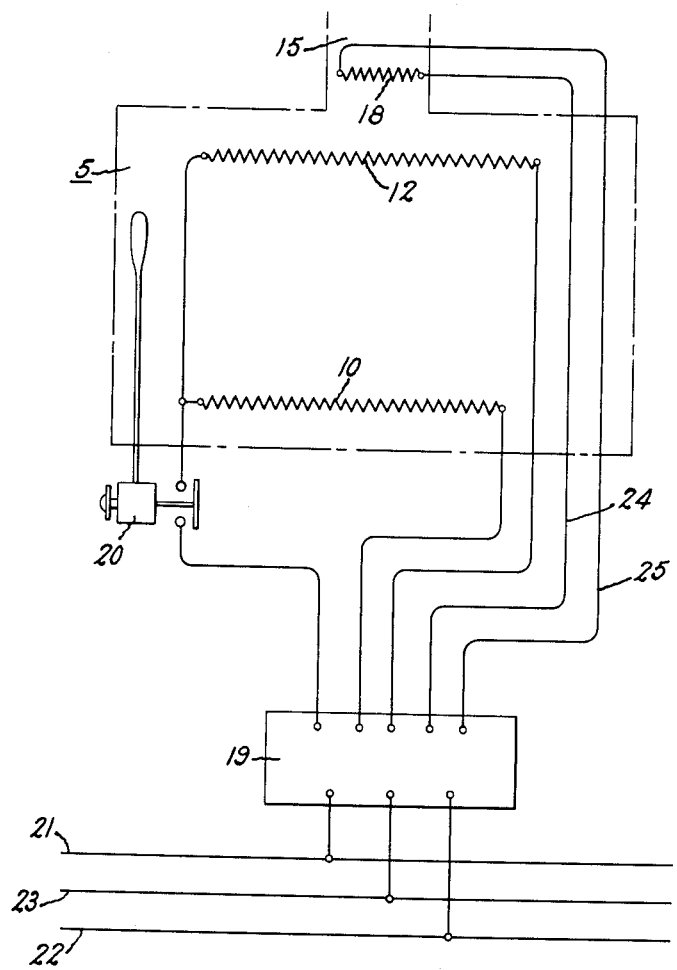
Figure 5 is a diagrammatic view of an oven embodying my invention.

Mounted within vent tube 15 is an auxiliary heating unit 18 comprising a plurality of open coils of wire suspended between opposite walls of vent tube 15. As illustrated in Figure 5, baking unit 10, broiling unit 12, and auxiliary heating unit 18, together with an oven control switch 19 and a thermostatic switch 20, are connected in a heating circuit. Electric power for the circuits controlled by switch 19 is supplied by a three-wire Edison type source, which may be 230 volt A. C., including conductors 21 and 22 and neutral line 23.

In the present embodiment of my invention, operation of the oven is controlled manually by a multiple-position, multiple-pole switch, but for obvious reasons, it might consist of several separate units all moved simultaneously by a single handle. Rotary disk or drum switches and other types of selector switches are all usable so long as they have the requisite number of handle positions and the proper circuit and contact positions. One type of construction which may be adapted for use in the present combination is that shown in United States Patent 2,203,236 granted on June 4, 1940, to Charles P. Randolph et al.

Figure 2:
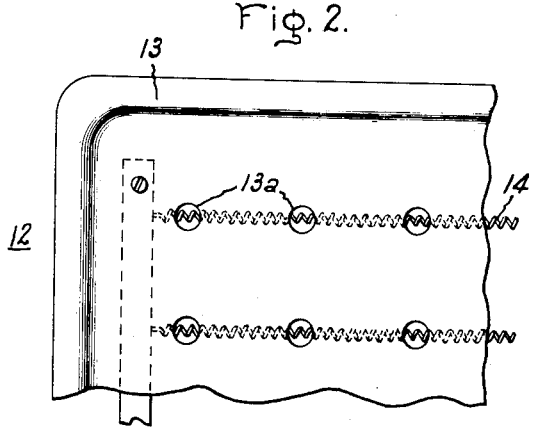
Figure 2 is an enlarged fragmentary top plan view of the broiling unit of my invention.
Figure 3:
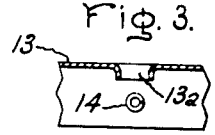
Figure 3 is an enlarged fragmentary sectional view of the broiling unit taken along the line 3—3 of Figure 1.
Figure 4:
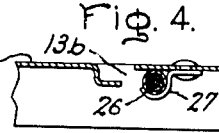
Figure 4 is similar to Figure 3 but shows a modified form of my invention.

As disclosed in the Randolph patent, control switch 19 is of the rotary type comprising at least four positions including an "off" position, a "pre-heat" position, a "bake" position and a "broil" position. When switch 19 occupies its "off" position, the circuits of the electric heating units 10, 12, and 18 are open; when the switch 19 occupies its "pre-heat" position, the baking unit 10 and broiling unit 12 are connected in multiple directly across the 230 volt source, and the circuit of the auxiliary heating unit 18 is open; when the switch 19 occupies its "bake" position, the baking unit 10 is connected directly across the 230 volt source, the circuit of the broiling element 12 is open and the auxiliary heating unit 18 is connected across the 115 volt tap of the source; and when the switch 19 occupies its "broil" position, the circuits of the baking unit 10 and auxiliary heating unit 18 are open and the broiling unit 12 is connected directly across the 230 volt source. It will be observed that auxiliary heating unit 18 is not controlled by thermostatic switch 20, being directly connected to control switch 19 by wires 24 and 25. Thus, auxiliary heating unit 18 is continuously energized when control switch 19 occupies the "bake" position. Referring to the broiling unit 10 as shown in Figure 2, perforations or apertures 13a are formed in reflector pan 13 and are spaced along the surface of the pan 13 directly over portions of heating element 14. These perforations are so positioned that any gases or smoke passing through them must necessarily be heated and come in contact with the adjacent portion of heating element 14. The heating elements may be of the open coil type as illustrated in Figures 2 and 3 or the sheath wire type as illustrated in Figure 4, in which a sheathed wire heating element 26 is supported adjacent aperture 13b by bracket 27. In either case the heating elements are supported in close proximity to the perforations in reflector pan 13 so as to perform the smoke eliminating function fully described below. It is important that substantially all of the smoke generated by cooking operations pass through the apertures in reflector pan 13 before passing into vent tube 14 and consequently, reflector pan 13 is generally coextensive with the top wall of oven 5. Also, a depending baffle 28 is provided at the top of the oven near the front opening thereof to prevent the escape of smoke during broiling operations when the oven door 7 is generally left in a partially open position.

In operation, my improved range functions to eliminate or substantially reduce the quantity of smoke generated during either broiling or baking operations by burning the smoke and thus transforming it into carbon dioxide and water vapor, both of which are colorless and odorless gases. During broiling operations, only the broiling unit is connected to the power supply by suitable contacts in oven control switch 19, baking unit 10 and auxiliary heating unit 18 being disconnected. As the broiling operation continues and the oven 5 is heated, air rises from the oven through vent tube 15, first passing through the perforations in reflector pan 13. As smoke is generated by the material being broiled, it, too, passes through the perforations into the space between the broiler pan and top wall 6 of the oven and thence into the vent tube 15. However, before passing through the perforations in reflector pan 13, it must first pass over the heating elements of broiling unit 12 and, in doing so, it is heated sufficiently to cause combustion. Substantially all of the smoke generated during broiling will be consumed in this manner and the gases issuing from the vent opening in the surface of the range will be both colorless and odorless.

During baking operation, only baking unit 10 is energized and consequently, auxiliary heating unit 18 is required to burn smoke generated by foods being cooked in this manner. Even in ranges of the type having a portion of the baking unit located in the top of the oven, some auxiliary heating means is required to eliminate the smoke because the baking unit is energized only intermittently to maintain the desired temperature. Consequently, the contacts of control switch 19 are arranged to provide a continuous flow of current to auxiliary heating unit 18 when the baking circuit is energized. Thus, any smoke generated by foods being baked in oven 5 is heated to the point of combustion by auxiliary heating unit 18 as it passes through vent tube 15. The heating capacity of an auxiliary heating unit sufficient to insure combustion of all smoke generated during baking operations depends on several factors including the size of the oven and the cross sectional area of the vent tube in which the heating unit is located, but is may be relatively small as compared with the capacities of the baking and broiling units. By way of example, a three or four-hundred watt heating unit is sufficient to substantially eliminate all smoke generated in ovens of domestic ranges commonly supplied for home use.

While I have shown and described a specific embodiment of my invention, I do not desire my invention to be limited to the particular construction shown and described and I intend by the appended claims to cover all modifications within the true spirit and scope of my invention.

What I claim as new and desire to secure by Letters Patent of the United States is:

1. In an electric range, an oven comprising walls defining a heating compartment having a front opening, a door for said opening, a baking unit for supplying heat to said oven, a broiling unit adjacent the top wall of said oven, a vent opening in one of the walls of said oven communicating with an opening in an exterior surface of said range to form an oven vent, an auxiliary heating unit located in said oven vent, and an electrical heating circuit including a selector switch for selectively connecting said baking and broiling units to a source of power and a thermostatic switch for controlling the temperature in said oven, said selector switch having a pair of contacts for simultaneously connecting said auxiliary heating unit to said source of power for continuous energization upon actuation of said selector switch to energize said baking unit.

2. In an electric range, a cooking top, a plurality of surface heating units located in openings in said cooking top, an oven comprising walls defining a heating compartment having a front opening, a baking unit adjacent the bottom wall of said oven, a broiling unit in the upper portion of said oven including a perforated reflector pan and a heating element, said reflector pan being generally coextensive with the top wall of said oven and mounted in spaced relation thereto, a baffle depending from said top wall between said front opening and the front edge of said broiling unit, a vent opening in said top wall, a vent tube connecting said vent opening with one of said openings in said cooking top to form an oven vent, each of the perforations in said reflector pan being located in close proximity to a portion of the heating element of said broiling unit whereby smoke produced by broiling foods in said oven passes over a portion of said heating element and is heated to the point of combustion before rising through said perforations and into said oven vent, an auxiliary heating unit located in said oven vent, and an electrical heating circuit including a selector switch for selectively connecting said baking and broiling units to a source of power and a thermostatic switch for controlling the temperature in said oven, said selector switch having a pair of contacts for simultaneously connecting said auxiliary heating unit to said source of power for continuous energization upon actuation of said selector switch to energize said baking unit, whereby smoke produced during baking operations is heated to the point of combustion as it passes through said oven vent.

3. In an electric range, an oven comprising walls defining a heating compartment, a vent opening in one of the walls of said oven communicating with an opening in an exterior surface of said range to form an oven vent, a heating element associated with said oven so as to supply heat thereto, an auxiliary heating unit mounted in said oven vent, a circuit for supplying electrical energy to said heating element and said auxiliary heating unit, thermostatic means in series with said heating element for varying the supply of energy thereto in accordance with the temperature in said oven, and switch means in said circuit for simultaneously connecting said heating element and said auxiliary heating unit to a source of electrical energy, whereby said auxiliary heating unit may be continuously energized independently of variations in the supply of energy to said heating element.

4. In an electric range, an oven comprising walls defining a heating compartment including a top wall having a vent opening therein, a baking unit for supplying heat to said oven, an auxiliary heating unit mounted in said vent opening, a circuit for supplying electrical energy to said baking unit and said auxiliary heating unit, thermostatic means in series with said baking unit for varying the supply of energy thereto in accordance with the temperature in said oven, switch means in said circuit for simultaneously connecting said baking unit and said auxiliary heating unit to a source of electrical energy, a reflector pan having a plurality of apertures supported adjacent said top wall in spaced relation therewith, and a heating element supported below said reflector pan in close proximity therewith, each of said apertures overlying a separate portion of said heating element, whereby smoke produced by cooking food in said oven passes over a portion of said heating element and said auxiliary heating unit before escaping from said vent opening.

References Cited in the file of this patent

UNITED STATES PATENTS

| | | |
|---|---|---|
| 1,033,555 | Dittbrenner | July 23, 1912 |
| 2,220,061 | Brown | Nov. 5, 1940 |
| 2,224,945 | Ames | Dec. 17, 1940 |
| 2,408,295 | Cossin | Sept. 24, 1946 |
| 2,525,062 | Berg | Oct. 10, 1950 |
| 2,556,597 | Pierson | June 12, 1951 |
| 2,569,652 | Berg | Oct. 2, 1951 |
| 2,669,645 | Schneider | Feb. 16, 1954 |